US009582741B2

United States Patent
Montfort et al.

(10) Patent No.: US 9,582,741 B2
(45) Date of Patent: Feb. 28, 2017

(54) SYSTEM DIAGNOSTIC TOOLS FOR PRINTMAKING DEVICES

(75) Inventors: David Bradley Montfort, Webster, NY (US); Eliud Robles Flores, Webster, NY (US); John R. Falvo, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 830 days.

(21) Appl. No.: 13/308,683

(22) Filed: Dec. 1, 2011

(65) Prior Publication Data

US 2013/0144557 A1    Jun. 6, 2013

(51) Int. Cl.
G06F 11/30 (2006.01)
G06K 15/00 (2006.01)
G06F 11/07 (2006.01)
G06K 15/02 (2006.01)

(52) U.S. Cl.
CPC .......... G06K 15/005 (2013.01); G06F 11/079 (2013.01); G06F 11/0733 (2013.01); G06K 15/027 (2013.01)

(58) Field of Classification Search
CPC ...... G06F 11/30; G06F 11/0733; B41J 29/393
USPC ........................................................ 702/185
See application file for complete search history.

(56) References Cited

U.S. PATENT DOCUMENTS

| | | | | |
|---|---|---|---|---|
| 5,412,452 A | * | 5/1995 | Rego et al. | 399/11 |
| 5,818,960 A | * | 10/1998 | Gregory, Jr. | H04N 1/6055 345/442 |
| 2006/0110009 A1 | * | 5/2006 | Klassen et al. | 382/112 |
| 2006/0158475 A1 | * | 7/2006 | Arquilevich et al. | 347/19 |
| 2009/0263145 A1 | * | 10/2009 | Mandel et al. | 399/9 |
| 2009/0274342 A1 | * | 11/2009 | Wu et al. | 382/112 |

* cited by examiner

Primary Examiner — John Breene
Assistant Examiner — Stephanie Bloss
(74) Attorney, Agent, or Firm — BudzynFortunato IP Law, LLC

(57) ABSTRACT

There is provided a method and system evaluating performance of a printing device. In accordance with the method a diagnostic routine is executed on the printing device. The diagnostic routine evaluates performance of the printing device using a set of instructions stored on a computer-readable medium. The set of instructions are configured to identify a fault in the performance of the printing device based on an artifact identifiable on at least one diagnostic output. The diagnostic output is generated by the printing device with the identifiable artifact in accordance with the diagnostic routine for identifying the artifact and associated fault of the printing device.

33 Claims, 6 Drawing Sheets

SYSTEM DIAGNOSTIC TOOLS FOR PRINTMAKING DEVICES

FIELD OF THE INVENTION

System diagnostic tools for printing devices are disclosed herein. Specifically, system diagnostic tools for identifying artifacts in printing devices are disclosed herein.

BACKGROUND OF THE INVENTION

Diagnosing problems with a printing device may be very difficult, especially for complex printing devices, such as, digital printing presses and production printers and copiers. Typically, when artifacts are identified on a printed sheet, service personnel and/or experts may be needed to diagnose and correct the defect that caused the artifact(s). The use of service personnel and/or experts can become costly as service personnel are usually required to be called on-site to diagnose and correct the defect. Additional costs may also be incurred during the downtime of the printing device, as the diagnosis and correction may be delayed while waiting for service personnel.

Moreover, pressure may be intense during diagnosis and correction of the defect, as each minute of downtime for a machine results in loss of productivity. Thus, quick and accurate diagnosis and correction of defects that cause artifacts is needed to reduce the downtime of the printing device.

Accordingly, a standard diagnostic routine that may be easily executed on the printing device without waiting for service personnel is desirable.

SUMMARY OF THE INVENTION

The following summary is provided to facilitate an understanding of some of the innovate features unique to the disclosed embodiments and is not intended to be a full description. An appreciation of the various aspects of the embodiments of the present invention can be gained by taking the specification, claims and drawings as a whole.

According to aspects illustrated herein, there is provided a system for evaluating performance of a printing device including a processor for receiving instructions for executing printing tasks, a printing device for marking a sheet of media in accordance with instructions received from the processor, and a user interface for initiating a diagnostic routine to evaluate performance of the printing device. The printing device selectively generates at least one diagnostic output with marking representation on the sheet of media in accordance with a set of instructions defining a diagnostic routine. The diagnostic routine generates a series of prints on a specific media sheet configured to stress at least one predetermined parameter of the printing device. The series of prints defines a diagnostic output. The diagnostic output includes a diagnostic template including mapping instructions and visual measurement aids, and a diagnostic image including a specific stress image. The diagnostic routine provides for identification of a fault based on an artifact identifiable on the at least one diagnostic output.

According to other aspects illustrated herein, there is provided diagnostic routine module including a user interface for initiating a diagnostic routine module to evaluate performance of a printing device; and the diagnostic routine module for generating instructions for a printing device. The instructions include generation of a series of prints on a specific media sheet configured to stress at least one predetermined parameter of the printing device. The series of prints define a diagnostic output, and the diagnostic output includes a diagnostic template including mapping instructions and visual measurement aids, and a diagnostic image including a specific stress image. The diagnostic routine provides for identification of a fault based on an artifact identifiable on the at least one diagnostic output.

According to further aspects illustrated herein, there is provided method for evaluating performance of a printing device including the steps of initiating a diagnostic routine by a user interface to evaluate performance of a printing device; executing the diagnostic routine on the printing device, the diagnostic routine is programmed to evaluate performance of the printing device using a set of instructions stored on a computer-readable medium. The set of instructions are configured to identify a fault in the performance of the printing device based on an artifact identifiable on at least one diagnostic output. Generating the at least one diagnostic output with the identifiable artifact in accordance with the diagnostic routine. The generating step can further include generating a diagnostic template having a variety of artifact identifiers thereon. Additionally, the generating step can include generating a diagnostic template having a variety of artifact identifiers thereon, generating the diagnostic image which stresses various parameters of the printing device associated with creation of the artifact. The generating step of the diagnostic template can include selecting the diagnostic template having a variety of artifact identifiers thereon, and printing the diagnostic template. The generating step of the diagnostic image can include selecting the diagnostic image which stresses various parameters of the printing device associated with creation of the artifact, and printing the diagnostic image.

According to another aspect illustrated herein, there is provided a method to evaluate performance of a printing device. The method comprises the steps of receiving by a processor at least one diagnostic template from a computer system, the at least one diagnostic template is associated with a fault of a printing device; receiving by a processor at least one diagnostic image from a computer system, said at least one diagnostic image is associated with the fault of the printing device; transmitting the at least one diagnostic template and the at least one diagnostic image to the printing device; printing a diagnostic output by the printing device, the diagnostic output includes markings thereon; and identifying artifacts of the marking and associated with the fault of a printing device.

BRIEF DESCRIPTION OF THE DRAWINGS

Like reference symbols in the various drawings indicate like elements.

DETAILED DESCRIPTION

Figure 1:
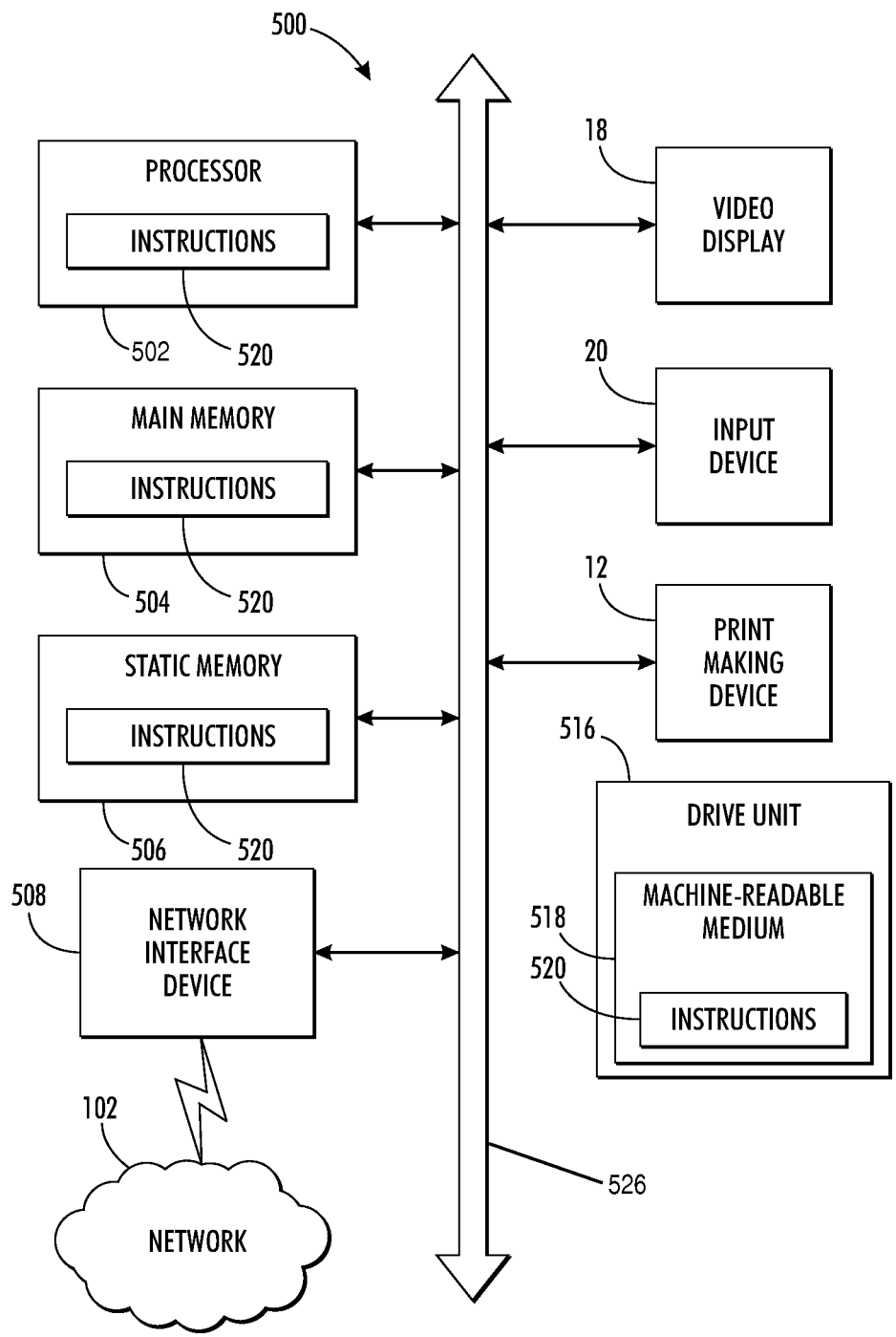
FIG. 1 provides a block diagram of a general computer system for use with the method and system of the present invention.

A diagnostic routine and method for evaluating performance and diagnosing the source of artifact(s) on a substrate media or computer screen are provided herein. The diagnostic routine of the present invention stresses a printing device to evoke a visual representation(s) of a fault(s) that may exist with the printing device. The diagnostic output of the diagnostic routine includes a stress image (diagnostic image), visual representations of the defect or fault (artifacts), and a diagnostic template with mapping information (i.e. cross process direction components) and visual aids (i.e. periodic graduations, scales, location identifiers, subsystem set points, etc.). Upon completion of the diagnostic routine, the customer or service representative has a concise series of prints to review to diagnose the print engine's health. In addition, corrective action for these faults is also printed on the substrate media allowing for corrective action of common problems.

A fault is an abnormal state with respect to the printing device, including dysfunction of a part, an assembly, or the whole system. Various faults can cause artifact(s) on an image. The occurrence of an artifact is associated with a number of factors and faults, which in turn is related to a number of symptoms. The diagnosis routine is used to predict and control the performance of a system.

As used herein, the term "printing device" refers to image processing device or any apparatus, such as a digital copier, a bookmaking machine, a facsimile machine, a multi-function machine, a flatbed scanner, and a wide format scanner, which use marking technologies to perform a scanning or printing outputting function for any purpose. Examples of devices using marking technologies include xerographic, inkjet, and offset marking. The printing devices may scan digital files and/or pre-printed sheets. The printing devices may also feed blank or pre-printed sheets into devices that use marking technology. The printing device may further be configured to perform processing on the scanned or fed sheets to reduce/enlarge images, convert file types, and/or duplicate or alter images.

As used herein, a "computer storage device" refers to a device for storing information and can be implemented using, for example, computer medium technologies, such as a floppy drive, hard drive, compact disc, tape drive, Flash drive, optical drive, read only memory (ROM), random access memory (RAM), and the like.

As used herein, "substrate media" refers to a tangible medium, such as paper (e.g., a sheet of paper, a long web of paper, a ream of paper, etc.), transparencies, parchment, film, fabric, plastic, or other substrates on which an image can be printed or disposed, and intangible media such as images on a display screen.

As used herein, a "data-processing apparatus" refers to a controller or processor that executes instructions, implements a process, procedure, computation, and the like.

As used herein, a "parameters" refers to characteristics of a printing device.

As used herein, an "image" refers to visual representation, such as a picture, photograph, computer document including text, graphics, pictures, and/or photographs, and the like, that can be rendered by a display device and/or printed on substrate media.

As used herein, "diagnostic routine" refers to performing a process, routine, procedure, task, and the like, to identify an artifact associated with the printmaking system.

As used herein, the term "diagnosis program" refers to a sequence of instructions written for a computer to perform the specified task of detecting changes between an original image and a processed image. The instructions may be executed by a processing device (i.e., a processor) and stored on a storage device (e.g., hard drive, compact disc, USB flash drive).

As used herein, the term "diagnostic output" refers to an image including a diagnostic template and in image therein, could include a printed sheet or a GUI.

As used herein, "artifact" refers to error, defect, fault, abnormal condition of the diagnostic image or image identified by the diagnostic template which is caused by a fault of the printing device.

As used herein, "stress" refers to a deliberate manipulation of a control parameter, or request to print a predetermined image, intended to induce a possibly undesired result or artifact in an output print.

As used herein, "features" refers to a control parameters of a printmaking machine which affects the quality, positioning, speed, alignment, imaging, coloring, assembly of an image and layers of images in an output print as it travels through a print path of a printing device.

The diagnostic routine of the present invention is performed by stressing all the features, parameters, element and portions of the printing device that will be used for a specific print job to identify any faults with the printing device or subsystems. The diagnostic routine can be executed either in proactive mode prior to running a large print job or in reactive mode after an artifact is identified on a customer print job. By running the diagnostic routine prior to running a print job, the performance of the printing device can be evaluated and reduce both waste and loss of productivity due to downtime. Running the diagnostic routine when a defect is initially identified may also be beneficial. Running the diagnostic routine can stream line the investigation as to the cause of the artifact and reduce the escalation of the artifact.

Advantages of the present invention include the ability to use the diagnostic routine to diagnose artifacts and correct faults in the printing device without requiring product engineers to be called on site to diagnose the artifact and fix the fault. The diagnostic routine provides the user with the ability to correct artifacts by adjusting machine parameters without the need for a product engineer. This in turn could reduce the eminence costs for the printing device.

A system and method for evaluating performance of a printing device are disclosed herein as shown in FIGS. 1-6. FIG. 1 is a block diagram of a general computer system 500 that can be used to perform the diagnostic routine of the presently claimed invention. The computer system 500 may include a set of instructions that may be executed to cause the computer system 500 to perform any one or more of the computer based functions or methods disclosed herein. The computer system 500, or any portion thereof, may operate as a standalone device or may be connected, e.g., using a network, to other computer systems, databases and peripheral devices. The computer system 500 can, for example, be the user computing system 10, networking system, and/or any system associated with a printing device 12.

Figure 3:
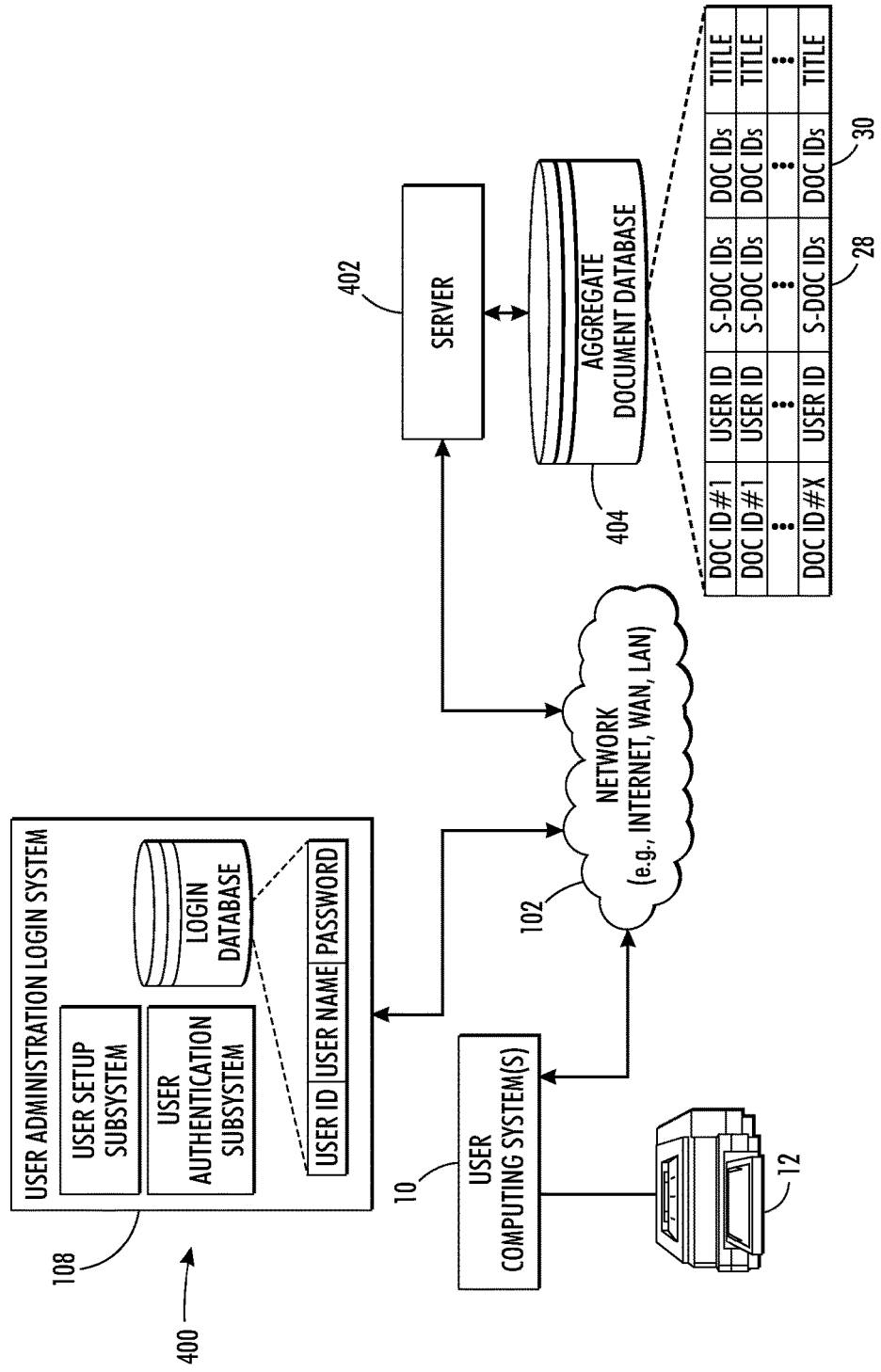
FIG. 3 provides a block diagram of a document management system for use with the method and system of the present invention.

In a networked deployment, the computer system 500 may operate in the capacity of a document management system 400 (or portion thereof) as illustrated in FIG. 3, for example. The computer system 500 may also be implemented as or incorporated into various devices, such as a personal computer (PC), a tablet PC, a personal digital assistant (PDA), a mobile device, a palmtop computer, a laptop computer, a desktop computer, a communications device, a control system, a scanner, a facsimile machine, a printer, a personal trusted device, a web appliance, or any other machine capable of executing a set of instructions (sequential or otherwise) that specify actions to be taken by that machine. Further, while a single computer system 500 is shown, the term "system" shall also be taken to include any collection of systems or sub-systems that individually or jointly execute a set, or multiple sets, of instructions to perform one or more computer functions as described herein.

As shown in FIG. 1, the computer system 500 can include a processor 502, e.g., a central processing unit (CPU), a graphics-processing unit (GPU), or both. The processor is configured to transmit diagnostic routine instructions to a printing device to be tested to initiate printing of the at least one diagnostic output. Moreover, the computer system 500 can include a main memory 504 and a static memory 506 that can communicate with each other via a bus 526. As shown, the computer system 500 can further include a video display unit 18, such as a liquid crystal display (LCD), an organic light emitting diode (OLED), a projection unit, a television, a flat panel display, a solid state display, or a cathode ray tube (CRT). Additionally, the computer system 500 can include an input device 20, such as a keyboard or a mouse, and printing device 12. The computer system 500 can also include a network interface device 508.

In a particular embodiment, as depicted in FIG. 1, the disk drive unit 516 can include a computer-readable medium 518 in which one or more sets of instructions 520, e.g., software, can be embedded. Further, the instructions 520 of the diagnosis program can embody one of the methods as described herein. In a particular embodiment, the instructions 520 can reside completely, or at least partially, within the main memory 504, the static memory 506, within the processor 502 and/or printing device 12 during execution by the computer system 500. The main memory 504 and the processor 502 also can include computer-readable media.

In accordance with various embodiments, the methods described herein may be implemented by software programs tangibly embodied in a processor-readable medium and can be executed by a processor. Further, in an exemplary, non-limited embodiment, implementations may include distributed processing, component/object distributed processing, and parallel processing. Alternatively, virtual computer system processing may be constructed to implement one or more of the methods or functionality as described herein. The diagnostic routine can be a web-based program accessible remotely by a user interface. The diagnostic routine module can be onboard the printing device, external to the printing device, remotely accessible, executable, useable and/or downloadable from an external source such as the internet and applied to various remote printing devices. The diagnostic routine module is configured to stress any individual or all features and parameters of various printing device.

The present application contemplates a computer-readable medium that includes instructions 520 or receives and executes instructions 520 responsive to a propagated signal, so that a device connected to a network 102 may communicate voice, video or data over the network 102. Further, the instructions 520 may be transmitted or received over the network 102 via the network interface device 508.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

Figure 2:
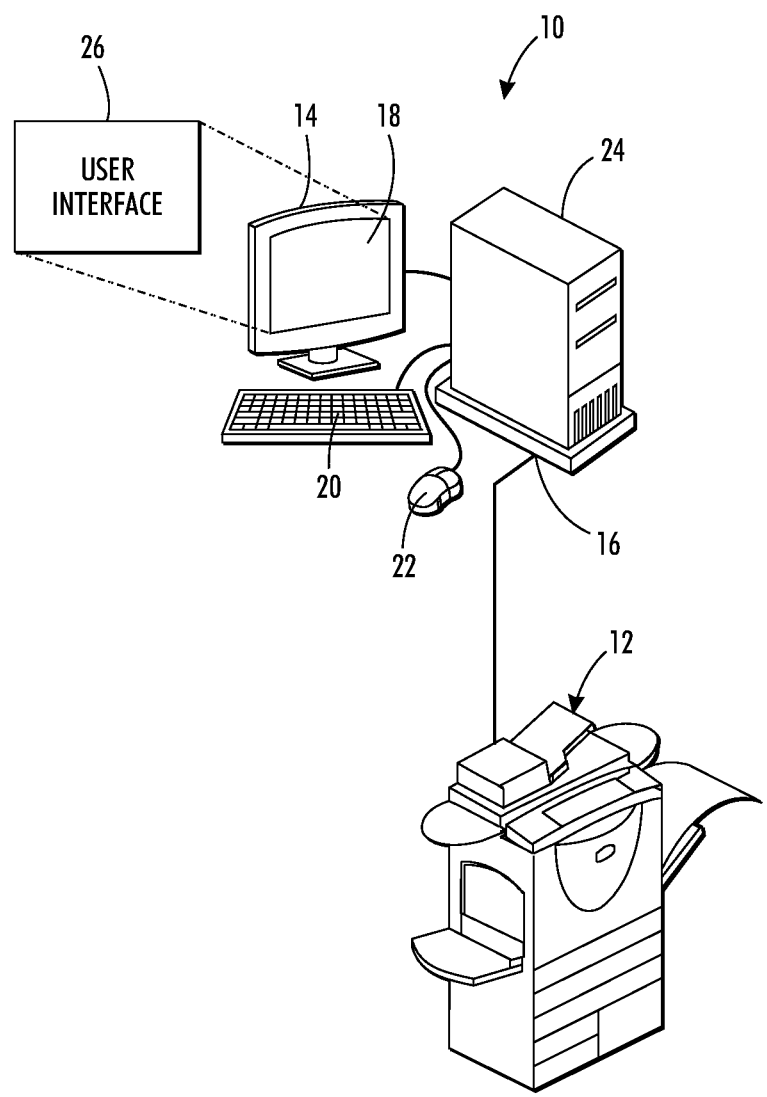
FIG. 2 illustrates an example of a printing device coupled to a data-processing apparatus of the present invention.

FIG. 2 illustrates an example of computing system 500 of a single user computing system 10 including a printing device 12 coupled to a data-processing apparatus 14. The data-processing apparatus 14 can be, for example, a personal computer or other computing device, and generally including a central processor 16, a display device 18, a keyboard 20, a pointing device 22 (e.g., mouse, track ball, pen device and the like), and other input/output devices associated therewith.

Printing device 12 can refer to an apparatus or system such as a printer, scanner, fax machine, copy machine, etc., and/or a combination thereof. Preferably, the printing device 12 is capable of multiple rendering functions such as printing, copying, scanning, faxing, etc. In some embodiments, printing device 12 can be implemented with a single rendering function. The printing device 12 is a print engine described herein.

The diagnosis routine program can be installed on the data-processing apparatus 14 or processor and can reside on the associated computer storage device 24, or server, or the diagnosis program can be installed on a computer storage device incorporated into the printing device 12. The data-processing apparatus 14 also includes a user interface 26 for communicating printing device features for processing, for example, a print job to a user and accepting the user's selection of available printing device features. The user interface 26 displays information and receives data though device display and/or the keyboard/mouse combination. The interface 26, also serves to display results, whereupon the user can supply additional inputs or terminate a given session. The diagnosis routine program can be activated through the user interface so that a user can generate a diagnostic template(s) and/or associated diagnostic images specifically created to stress the parameters to be tested for processing by the printing device 12. The user interface 26 can be a variety or hardware for initiating a diagnostic routine module to evaluate performance of a printing device. The user interface can be located on the printing device, a computer connected to a printing device, wirelessly to a processor associated with a printing device or network.

FIG. 3 illustrates an example document management system 400 that includes a server 402 interconnected to a user computing system(s) 10 via a network 102. The network 102 can be a wide area network, local area network, or any combination of one or more networks configured to interconnect the systems, databases and other components of FIG. 1. One or more of the networks can be wired or wireless.

The user computing system(s) 10 is configured to login into the document management system 400 over the network 102 to generate and/or access one or more aggregate documents. The user computing system 10 is further configured to export an aggregate document in a printable format for printing. As an example, the user computing system 10 can print the aggregate document via printing device 12. The printing device 12 can be attached directly or via a network (e.g., LAN) to the user computing system 10. The user computing system 10 can be operated by a user (e.g., human operator or an aggregator/publisher program) to access, generate and/or export aggregate documents via the server 402 of the document management system 400.

Additionally, user administration/login system 108 can be configured to administer users in the document management system 400 and to enable users to login into the document management system 400 over the network 102 via user computing system(s) 10. The user administration/login system includes a user setup subsystem, user authentication (login) subsystem, and user login database. Upon user login, the user authentication subsystem can authenticate a user's username and password received from the user computing system 10 against the username-password combinations in the user login database. After the user is authenticated, the user via user computing system 10 can access the serve 402 via the user's user ID associated with the user's username/password combination. Additional or alternative authentication methods and system components can be used to login the user to the document management system 400. The server 402 is configured to enable a user (e.g., human operator or electronic aggregator/publisher program) to access, search, download, generate an aggregate document from the document database 404 that stores the aggregated documents including but not limited to instructions for adjusting or repairing a fault of a feature or parameter of a printing device, diagnostic templates, diagnostic images and other documents described herein. The server 402 can expose or provide multiple application program interfaces (APIs) that can be invoked by the electronic diagnostic routine programs via computing system(s) 10 to access, generate and/or export aggregate documents via the network or server. Additionally, the databases 404 can also be distributed and maintained by one or more other systems.

Figure 4:
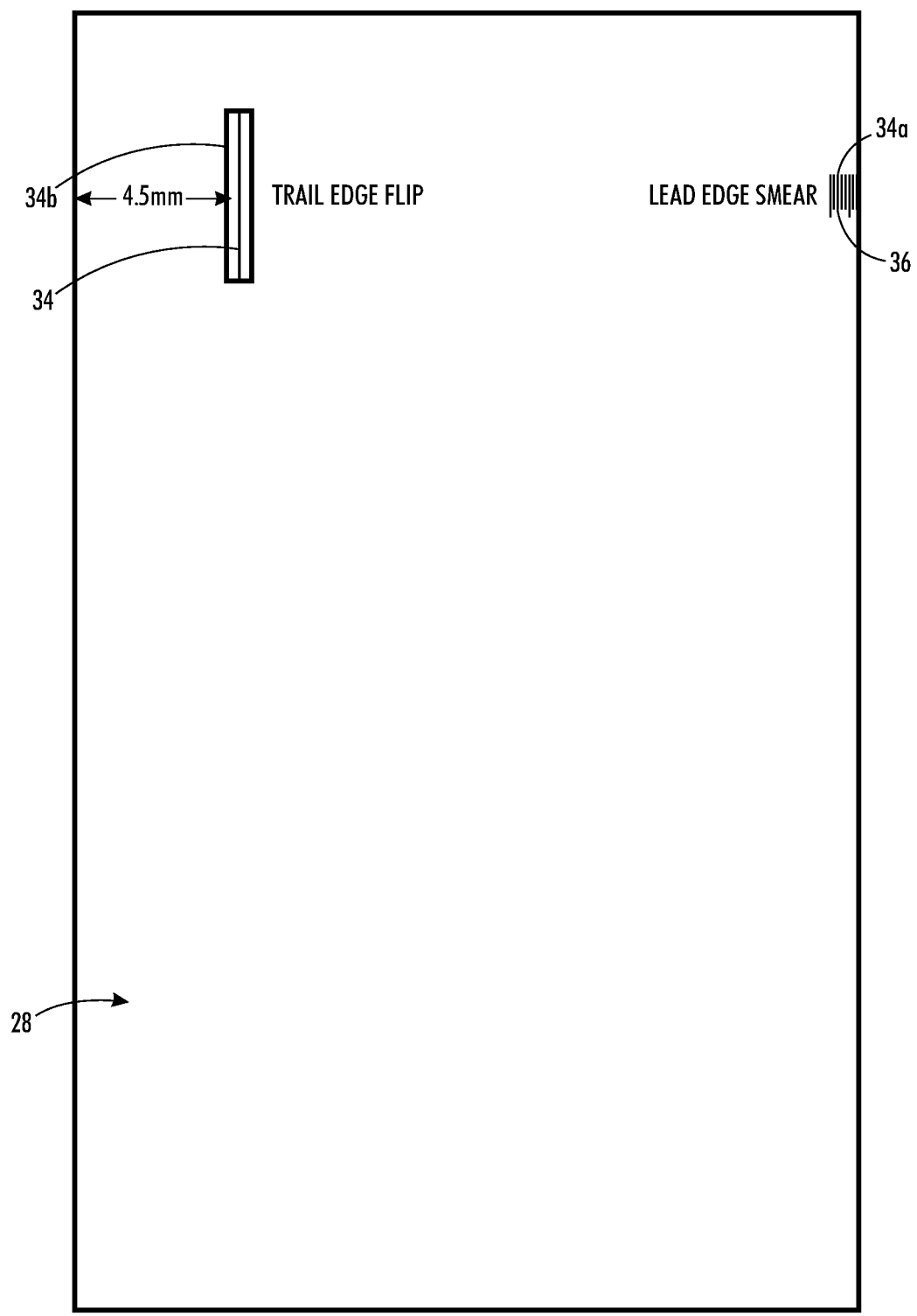
FIG. 4 provides an example diagnostic template for use with the method and system of the present invention.

This diagnostic routine of the present invention includes choosing a diagnostic template, choosing a diagnostic image and running the printing device to create a diagnostic output. FIG. 4 is an example of a diagnostic template 28. The diagnostic template 28 is a graphical, numerical, mapping instructions, measurement aids, and/or visual marking (s) on a substrate media or screen that is used to detect an artifact of a diagnostic image in a print job which is related to a process associated with the printing device 12. The diagnostic template 28 can include a variety of identifiers with mapping information (i.e. cross process direction components) and visual aids (i.e. periodic graduations, scales, location identifiers, subsystem set points, etc.) to assist with identifying a specific problem with the printer's function, settings or other parameters that affect the print job. A specific diagnostic template 28 is chosen by the user from a variety of diagnostic templates. The diagnosis template 28 is chosen based on the parameters being used in the print job. The diagnosis templates can be provided to the user in a hard copy form or a soft copy form. The soft copy form includes a software program that is stored on the computer storage device 24 of the computer, the memory of the printing device or an external storage device. The soft copy version allows for testing of various substrate media parameters, i.e. thickness of substrate media, by printing the diagnostic template 28 directly on the substrate media that is being used for the print job. Additionally, it is contemplated that the diagnostic template 28 can be custom designed by the user, using a program to select specific parameters that the user wishes to test. The diagnostic template 28 includes template markings used to identify artifacts. FIG. 4 shows one example of a diagnostic template 28 including template markings 34 which include the trail edge flip artifact location window 34*b* positioned 4.5 mm from the sheet trail edge to determine proper positioning of the trail edge, and the lead edge smear artifact graduations scale 34*a* to identify proper alignment and movement of the lead edge through the print path. Other markings can include but are not limited to other artifacts/faults/areas such as development wire strobing (for example, a periodicity scale), media handling (full component paper path mapping image), ROS (banding periodicity scale), subsystem set point information where the window can be moved in succession to prevent defect overlay, and combinations thereof. The diagnostic template 28 can be a transparent overlay that is used to overlay a diagnostic image for identifying an artifact on the diagnostic image. An "overlay" refers a transparent sheet containing graphic matter to be superimposed on another sheet, such as a diagnostic image 30.

After the diagnostic template 28 is prepared, created or chosen, an associated diagnostic image 30 is chosen. The diagnostic image 30 is designed to evoke, cause or uncover an image defect or fault that may exist. The diagnostic image 30 overlays the diagnostic template 28 and the parameters of the template are aligned with the image to provide a visual identification of the compliance of the diagnostic image 30 with the diagnostic template 28. The diagnostic image 30 can be a single image stress or a plurality or series of image stresses developed by each subsystem expert to produce a series of diagnostic output(s) to identify an artifact. The diagnostic image 30 can be a customize overlay including a specific customer image from the print job or a stock test pattern. This diagnostic routine provides a full spectrum of image stresses, diagnostic images 30, to identify print engine performance issues. The diagnostic image 30 is a specific test pattern that can include specific color(s), shapes, designed, and combinations to stress the printing device components that are associated with the specific parameter (s) to be tested. For example, diagnostic image 30 is a light black (K50% FPHT or 50% Black Full Page Half Tone) which is a stock test pattern used to diagnose the Trail Edge Flip and LE Smear artifacts as shown in FIG. 3. The diagnostic image 30 also includes bullet markings which are location markers used by scanning devices that later check the print for various specifications. The writing shown in the lower right corner is part of the diagnostic image 30 which shows the image ID along with a mark that tells us the Lead Edge Out Board Position of the page. The diagnosis routine uses the diagnostic image 30 to stress all the features, parameters, element and portions of the printing device 12 that will be used for the print job. Stressing the device is accomplished in a variety of ways from printing various colors, shapes, patterns, and/or printing on specific types of media sheets with a predetermined property, or combinations thereof. Stressing the device includes causing the printing device to print the diagnostic output on a media of a predetermined property. Some predetermined properties include heavyweight stock, lightweight stock, coated stock, textured stock. Additionally, stressing the device can be accomplished by causing the printing device to print a stress image having a specific color pattern or color tone, such as a 50% black halftone, red patch.

Below is a System Diagnostic Tools Chart which provides an example of various parameters or features that can be tested to investigate image quality issues. This chart is not an exhaustive list as there are many other features and parameters that can be tested using the method of the present invention. The chart illustrates the parameters to be tested, the diagnostic image or stress image associated with that parameter being tested, and the expected artifact created should there be an error, fault or defect with the parameter.

System Diagnostic Tools Chart

| Parameter | Stress Actions (to create features/artifacts) | Features (artifacts created under stress actions) |
|---|---|---|
| Transfer Deck - inlet paper baffle to photoreceptor distance (gap). | Print a stress image, in this case a 50% black halftone, on stress papers (a lightweight and a heavyweight stock). | For the lightweight paper the lead edge could either smear or exhibit deletions. The heavyweight paper can exhibit the same artifacts as the lightweight in addition to exhibiting a trail edge flip band (45 mm from the trail edge). |
| Transfer Assist Blade | Print a stress image, in this case a 50% black halftone, on stress papers (a lightweight and a heavyweight stock). | If the TAB is excessively worn, a variety of defects manifests and cause image quality issues. |
| Acoustic Transfer Assist | Print a stress image, in this case a 100% Red patch, on stress papers (a coated mid-weight and a textured heavyweight stock). | If the Transducer tip alignment within the plenum is not in specification, the red image on the coated mid-weight stock will appear mottled. If the red image on the textured stock exhibits a non-uniform density then then several actions would need to be investigated, including: Transducer power supply issues. Vacuum coupling level. Transducer alignment issues. Transducer not functioning properly. |
| Paper registration | Print a stress image, in this case an IOP (image on paper - used to check registration metrics), on various levels of paper weight. | If the registration is out of specification, then the image marks to paper edge distance will be incorrect. Several causes can lead to this and are well documented in the electronic documentation (EDoc's), which the template would steer the operator to. |
| Prefuser transport | Print a stress image, in this case a 50% black halftone, on a stress paper (coated mid-weight stock). | Image quality artifacts emerging from this Prefuser transport subsystem typically exhibit density shifts that coincide with the belt positions. |

Once the diagnostic template 28 and diagnostic image 30 are chosen the diagnosis routine is performed in the printing device to yield a diagnostic output 32. The diagnostic output 32 is designed to stress individual subsystems, competent of the printing device to magnify a particular fault for identification of all faults regardless of how slight the defect is. The diagnostic output 32 provides valuable visual aid(s) to establish printer performance. The diagnostic routine provides a full spectrum of image stresses to identify print engine performance issues. The diagnostic template 28 is introduced to the printing device by instructions sent from the user interface, printing device, i.e. diagnosis button thereon, external inputs, and the like. The diagnostic template 28 can be inserted into the paper path as a hard copy. The diagnosis image 30 is printed or imaged on the diagnostic template 28 to yield a diagnosis output 32. The diagnosis output 32 exits the printing device, and/or paper path, for analysis by the user.

Figure 5:
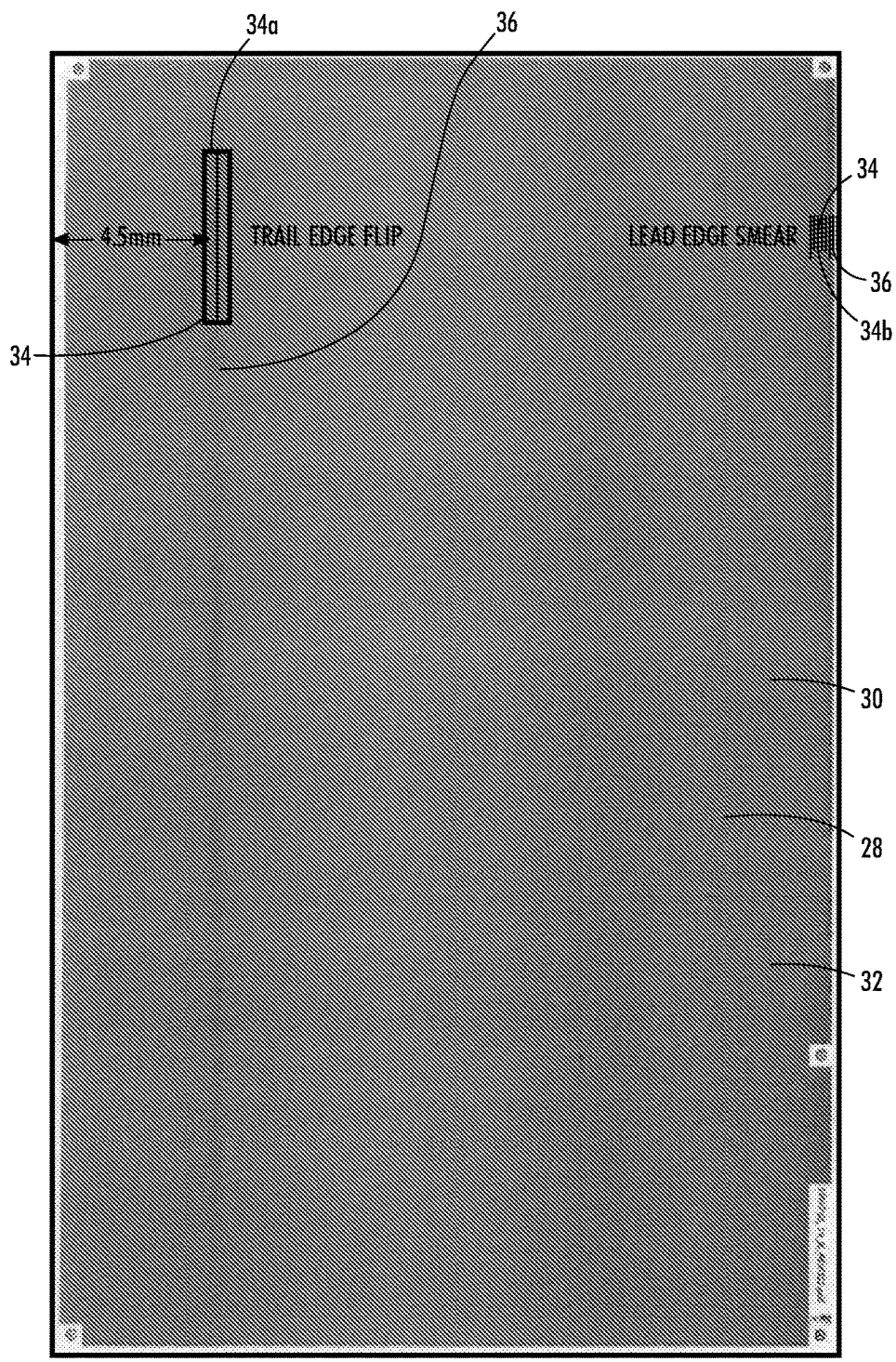
FIG. 5 provides an example diagnostic output including the diagnostic template of FIG. 4 for use with the method and system of the present invention.

FIG. 5 shows the diagnosis output 32 including the diagnostic template 28 and the diagnosis image 30 overlaying and imaged thereon. Based on the comparison of the diagnostic image 28 in relation to the template markings 34 the user can identify any artifacts 36. The artifacts are marking representations on the diagnostic image 28. If the customer were to run a print job the identified artifacts may or may not show up on the print job due to the fact that the actual image of the print job may not extend into the areas or edges were the artifacts are present, of the type of image, i.e. specific coloring, may not show artifact. The diagnostic routine identifies the faults based on the worst case scenario by requiring the printing device, or stressing the printing device, to print the image that would most likely show the artifact if a fault existed. Once the artifacts 36 are identified on the diagnostic output 32, the user refers to the associated manual which provides instructions to correct the fault of the printing device or associated subsystem causing the identified artifact 36. FIG. 3 identifies artifacts 36 including a trail edge flip defect as a dark line extending vertically along the page, and the lead edge smear shown as a darker marking on the right edge of the substrate media. The user adjusts the required settings in accordance with the instruction manual and reruns the diagnostic routine to verify that the fault has been corrected by showing no evidence of artifacts on the diagnostic output.

Figure 6:
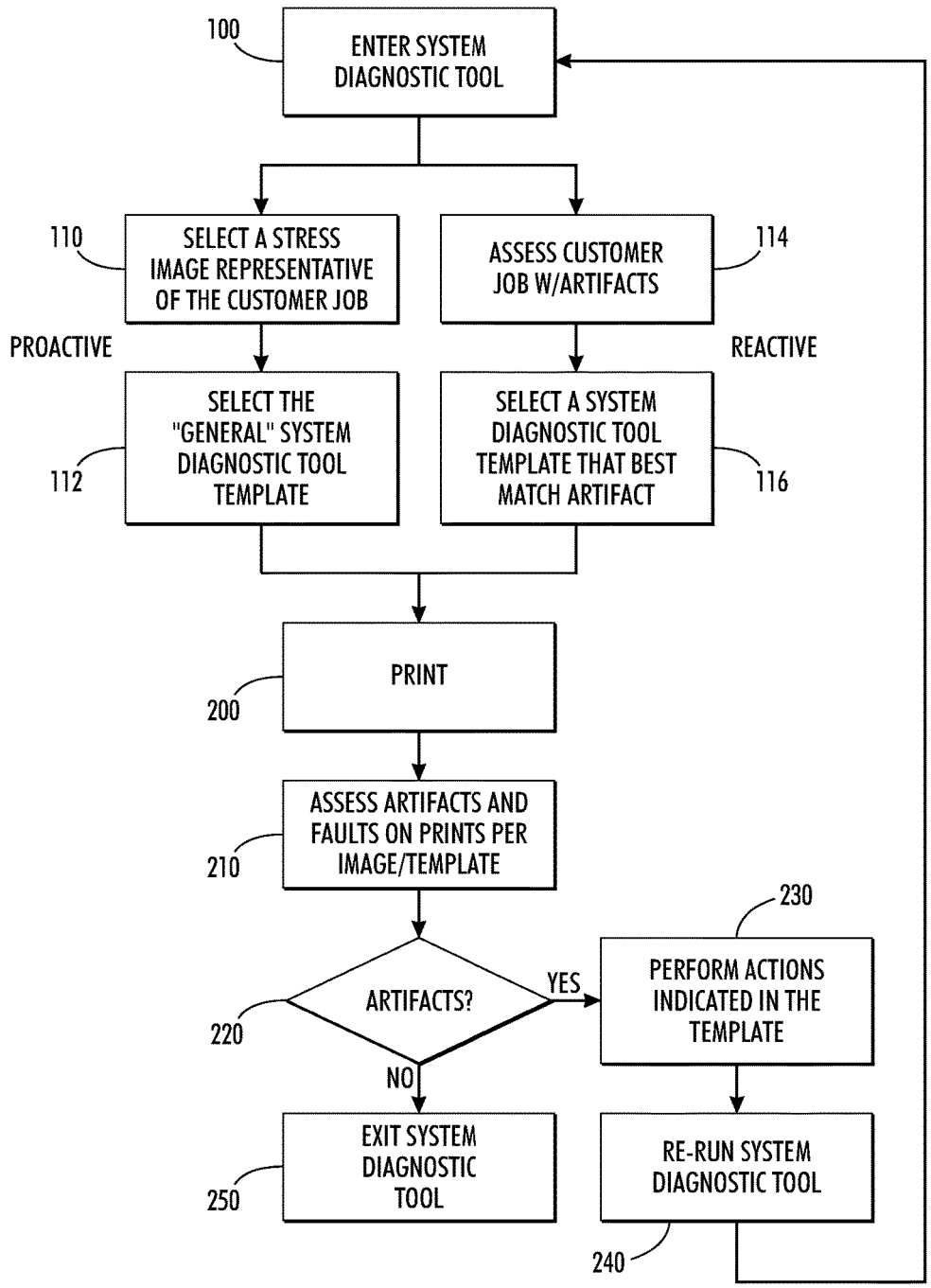
FIG. 6 provides a block diagram of the method of the present invention.

FIG. 6 shows a block diagram of the method of both proactive diagnostic routine and reactive diagnostic routine. The proactive diagnostic routine is performed prior to initiating a printmaking job. The reactive diagnostic routine is performed during a printmaking job upon discovery of an artifact.

The system diagnostic tool or diagnostic routine module is initiated 100 by a user interface. The user interface includes a diagnostic button on a printing device, a remote computer, network access device, external inputs, wireless devices, and the like. The user interface initiates a diagnostic routine module to evaluate performance of a printing device. The diagnostic routine module generates instructions for the printing device. The instructions of the proactive diagnostic routine includes generating or selecting a series of prints on a specific media sheet configured to stress at least one predetermined parameter of the printing device. The series of prints are defined as the diagnostic output. The diagnostic output includes that diagnostic template and image. This step 110 includes selecting, generating or receiving at least one diagnostic image which is a stress image representative of the customer's print job. Next, the diagnostic template, having a variety of artifact identifiers, is generated, selected or received 112 using the general system diagnostic tool template. Instructions are transmitted to the printing device and the printing device is instructed 200 by the diagnostic routine module to print the diagnostic output which includes the diagnostic image and diagnostic template. The diagnostic output is analyzed 210 and any artifact(s) are identified on each diagnostic output. The next step 220 is a logic step determining if an artifact does exist. If the artifact exists, then actions are performed in accordance with the instructions provided for each specific artifact 230 to correct the source of the artifact such as a fault or error with the printing device. Then the diagnostic routine is re-run 240 in a loop to verify that the error/fault was corrected and no further artifacts associated with this customer's job is found. Once it is determined that no artifacts exist, then the customer's print job is performed 250.

Alternatively, during the course of performing a print job, if an artifact/defect is found on the image, the print job is interrupted to perform the reactive diagnostic routine. The reactive diagnostic routine is performed in the same manner as the proactive sequence. The system diagnostic tool is initiated 100, the customer's print job can be used as the diagnostic image 114 or a stock image can be used, a diagnostic template is chosen 116 which best aligns with the discovered artifact. The diagnostic output is printed 200, analyzed 210, and the user determines 220 if artifact exists. The fault is fixed 230 based on the findings of the diagnostic output. The program 240 is re-run to verify that the error or fault was corrected. If artifacts no longer exist, the diagnostic routine is terminated and the customer continues 250 with the print job.

It will be appreciated that various of the above-disclosed and other features and functions, or alternative thereof, may be desirably combined into many other different systems or applications. Various presently unforeseen or unanticipated alternatives, modifications, variations, or improvements therein may be subsequently made by those skilled in the art which are also intended to be encompassed by the following claims. In addition, the claims can encompass embodiments in hardware, software, or a combination thereof.

What is claimed is:

1. A system for evaluating performance of a printing device comprising:
   a processor for receiving instructions for executing printing tasks, and
   a printing device for marking a sheet of media in accordance with instructions received from said processor, wherein said printing device selectively generates at least one diagnostic output including a marking representation on said sheet of media in accordance with a set of instructions defining a diagnostic routine; and
   a user interface for initiating a diagnostic routine to evaluate performance of said printing device, said diagnostic routine generates a series of prints on a specific media sheet configured to stress at least one predetermined parameter of said printing device, at least one print of said series of prints defining a diagnostic output, said diagnostic output includes a diagnostic template including mapping instructions and visual measurement aids, and a diagnostic image including a specific stress image associated with said at least one predetermined parameter of said printing device, said diagnostic routine provides for identification of a fault based on an artifact identifiable on said at least one diagnostic output;
   wherein said mapping instructions and visual measurements aids overlay said diagnostic image to align with said artifact on said diagnostic output, and wherein each of said visual measurements aids contains a printed numerical representation of a distance of one of said at least one predetermined parameter to be stressed by said diagnostic output.

2. The system of claim 1, wherein said at least one diagnostic routine is configured to stress all features of said printing device.

3. The system of claim 1, wherein said stress includes causing said printing device to print said diagnostic output on a media of at least one predetermined property.

4. The system of claim 3, wherein said predetermined property includes heavyweight stock.

5. The system of claim 3, wherein said predetermined property includes lightweight stock.

6. The system of claim 3, wherein said predetermined property includes coated stock.

7. The system of claim 3, wherein said predetermined property includes include textured stock.

8. The system of claim 1, wherein said stressing of said at least one predetermined parameter of said printing device includes causing said printing device to print said stress image having a specific color tone.

9. The system of claim 8, wherein said specific color tone is a 50% black halftone.

10. The system of claim 8, wherein said specific color tone is a red patch.

11. The system of claim 1, wherein said stressing of said at least one predetermined parameter of said printing device includes causing said printing device to print said stress image having a specific color pattern.

12. The system of claim 1, wherein said artifact is generated on said at least one diagnostic output, if a fault exists with said at least one predetermined parameter of said printing device.

13. The system of claim 1, wherein said artifact is said marking representation on said diagnostic image.

14. The system of claim 1, wherein said processor is configured to transmit diagnostic routine instructions to said printing device to initiate printing of said at least one diagnostic output.

15. The system of claim 1, wherein said diagnostic template includes a variety of identifiers thereon to identify the artifact on said diagnostic image.

16. The system of claim 15, wherein said variety of identifiers include graphical markings, numerical markings, visual markings, and combinations thereof.

17. A diagnostic routine module comprising:
    a user interface for initiating a diagnostic routine module to evaluate performance of a printing device; and
    said diagnostic routine module for generating instructions for a printing device, said instructions include generation of a series of prints on a specific media sheet configured to stress at least one predetermined parameter of said printing device, at least one print of said series of prints defining a diagnostic output, said diagnostic output includes a diagnostic template including mapping instructions and visual measurement aids, and a diagnostic image including a specific stress image associated with said at least one predetermined parameter of said printing device, said diagnostic routine provides for identification of a fault based on an artifact identifiable on said at least one diagnostic output;
    wherein said mapping instructions and visual measurements aids overlay said diagnostic image to align with said artifact on said diagnostic output, and wherein each of said visual measurements aids contains a printed numerical representation of a distance of one of said at least one predetermined parameter to be stressed by said diagnostic output.

18. The module of claim 17, wherein said user interface is located on a computer connected to said printing device.

19. The module of claim 17, wherein said user interface is located on said printing device.

20. The module of claim 17, wherein said diagnostic routine is a web-based program accessible remotely by said user interface.

21. The module of claim 17, wherein said diagnostic routine module is onboard the printing device.

22. The module of claim 17, wherein said diagnostic routine module is external to said printing device.

23. The module of claim 17, wherein said diagnostic routine module is configured to stress all features and parameters of said printing device.

24. The module of claim 17, wherein said artifact is generated on said at least one diagnostic output, if a fault exists with said printing device.

25. The module of claim 17, wherein said artifact is said marking on said diagnostic image.

26. The module of claim 17, wherein said diagnostic routine module is configured to transmit diagnostic routine instructions to said printing module to initiate printing of said at least one diagnostic output.

27. The module of claim 17, wherein said diagnostic template includes a variety of identifiers thereon to identify the artifact on said diagnostic image.

28. The module of claim 27, wherein said variety of identifiers include graphical markings, numerical markings, visual markings, and combinations thereof on a substrate media.

29. A method for evaluating performance of a printing device comprising:
   initiating a diagnostic routine by a user interface to evaluate performance of a printing device;
   executing said diagnostic routine on said printing device, said diagnostic routine being programmed to evaluate performance of the printing device using a set of instructions stored on a computer-readable medium, said set of instructions configured to identify a fault in said performance of said printing device based on an artifact identifiable on at least one diagnostic output; and
   generating said at least one diagnostic output with said identifiable artifact in accordance with said diagnostic routine, said diagnostic output including a diagnostic template having mapping instructions and visual measurement aids, and a diagnostic image including a specific stress image associated with at least one predetermined parameter of said printing device wherein said mapping instructions and visual measurements aids overlay said diagnostic image to align with said artifact on said diagnostic output, and wherein each of said visual measurements aids contains a printed numerical representation of a distance of one of said at least one predetermined parameter to be stressed by said diagnostic output.

30. The method of claim 29, wherein said generating step comprises generating said diagnostic template having a variety of artifact identifiers thereon.

31. The method of claim 29, wherein said generating step comprises generating said diagnostic template having a variety of artifact identifiers thereon, and generating said diagnostic image which stresses various parameters of said printing device associated with creation of said artifact.

32. The method of claim 31, wherein said generating step comprises selecting said diagnostic template having a variety of artifact identifiers thereon, and printing said diagnostic template; and selecting said diagnostic image which stresses various parameters of said printing device associated with creation of said artifact, and printing said diagnostic image.

33. A method to evaluate performance of a printing device, said method comprising:
   receiving by a processor at least one diagnostic template from a computer system, said at least one diagnostic template is associated with a fault of a printing device, and having mapping instructions and visual measurement aids;
   receiving by a processor at least one diagnostic image from a computer system, said at least one diagnostic image is associated with said fault of said printing device;
   transmitting said at least one diagnostic template and said at least one diagnostic image to said printing device;
   printing a diagnostic output by said printing device, said diagnostic output includes markings thereon and said mapping instructions and visual measurements aids overlaying said diagnostic image, each of said visual measurements aids containing a printed numerical representation of a distance of one of said at least one predetermined parameter to be stressed by said diagnostic output;
   identifying artifacts of said marking and associated with said fault of a printing device.

* * * * *